United States Patent [19]

Koike

[11] Patent Number: 4,482,990
[45] Date of Patent: Nov. 13, 1984

[54] SIMPLIFIED SOUND-REPRODUCING DEVICE FOR A RECORD DISC HAVING A PLURALITY OF RECORDED GROOVES

[75] Inventor: Eishi Koike, Sagamihara, Japan
[73] Assignee: Ozen Corporation, Tokyo, Japan
[21] Appl. No.: 551,597
[22] Filed: Nov. 14, 1983
[30] Foreign Application Priority Data Aug. 31, 1983 [JP] Japan .............................. 58-159987

[51] Int. Cl.³ .................... G11B 17/00; G11B 3/00; A63H 3/33
[52] U.S. Cl. ................................. 369/63; 369/31; 369/67; 369/264
[58] Field of Search .................. 369/63, 65, 66, 67, 369/264, 266, 31

[56] References Cited

U.S. PATENT DOCUMENTS

| | | | |
|---|---|---|---|
| 3,525,527 | 6/1968 | Sindlinger | 369/66 |
| 3,712,629 | 1/1973 | Watanabe | 369/63 |
| 4,404,667 | 9/1983 | Koike | 369/67 |
| 4,404,668 | 9/1983 | Watanabe | 369/65 |

Primary Examiner—Charles Frankfort
Assistant Examiner—Thomas P. Matechi
Attorney, Agent, or Firm—Basile, Weintraub & Hanlon

[57] ABSTRACT

The sound-reproducing device for playing the record disc has a number of selection poles corresponding to the member of recorded grooves and a stylus force releasing wheel normally urged to a specific direction but which rotated by one of the selection poles to release stylus force on a pickup. The stylus force releasing wheel includes a locking arm confronting the back face of the selection pole in an advanced position for pushing the inclined face of the releasing wheel. Each of the selection poles has a jaw which catches the locking arm and prevents the selection pole when in an advanced position from retraction. A locking device locks the stylus force releasing wheel at the position to which the wheel has rotated. A record disc unit includes a turn table and a record face member disposed in a stacked but axially separable arrangement. A stopper pin is disposed on the record face member. A ratchet is interposed between the turn table and the record disc member so that the turn table alone can rotate and is urged and moved along the center pin by the ratchet by ratchet bight toward the bottom plate of chassis during the time when the stopper pin engages the selection pole and temporarily locks the record face member from rotation. The locking device includes a hook for locking the stylus force releasing wheel at a rotated position and an inclined face for unlocking the locked wheel.

3 Claims, 8 Drawing Figures (A)

(B)

(C)

(D)

SIMPLIFIED SOUND-REPRODUCING DEVICE FOR A RECORD DISC HAVING A PLURALITY OF RECORDED GROOVES

BACKGROUND OF THE INVENTION

1. Field of the Invention

This invention relates to a simplified sound-reproducing device for playing a record disc having a plurality of recorded grooves.

2. Description of the Prior Art

A simplified sound-reproducing device capable of selectively reproducing sound from a record disc having a plurality of recorded grooves has already been developed and known to the public (Japanese Patent Publication No. 19763/1976, U.S. Pat. No. 3,712,629 and British Patent No. 1,336,749).

According to the above-mentioned simplified sound-reproducing device, the operator's pushing of a selection pole will cause the inclined face of a stylus force releasing wheel to rotate. Then the stylus force releasing lever carried by the wheel also rotates together with the stylus force releasing the wheel and picks up a speaker unit which permits a pickup to return to the starting point of sound reproduction on a recorded face of a record disc unit. At the same time, the selection pole also locks a stopper pin disposed on the record disc to temporarily stop rotation of the record disc unit and thereby position a specific recorded groove in a location for engagement with the pickup, which has already returned to the starting point of sound reproduction.

Thus, upon subsequent release of the selection pole, the stylus force releasing lever will retract together with the stylus force releasing wheel which, in turn, releases its engagement with the speaker unit so that the necessary stylus force can be impaired to the pickup.

Accordingly, stylus force is often unwillingly imparted during the period when the pickup is returning to the starting point of sound reproduction, unless the operator continues his depression of the selection pole until the stopper pin can engage the specific selection pole which he has pushed.

Such malfunction may after make arbitary selection of the desired recorded groove difficult.

Appropriate timing of the stopper pin with the depressed selection pole varies upon the relative distance between the stopper pin and the selection pole which is difficult for the operator to forecast.

Accordingly, the aforesaid sound-reproducing device still bears drawbacks in exact selection and rapidness in manipulation.

SUMMARY OF THE INVENTION

This invention aims to obviate such problems encountered in the prior art device as mentioned above.

An object of the present invention is to provide a simplified sound-reproducing device which is able to exactly select and reproduce the recorded groove of the desired item.

Another object of the invention is to provide a simplified sound-reproducing device which enables prompt selection of sound reproduction of the recorded groove.

This invention is an improvement in a simplified sound-reproducing device comprising a number of selection poles corresponding to the number of recorded grooves in the record face of the record disc unit and a stylus force releasing wheel which is normally urged to rotate in a pre-determined direction and rotates when pushed by the selection pole to release the stylus force exerted on the pickup.

A number of inclined faces corresponding to the number of recorded grooves formed on the record face of the record disc are provided on the stylus force releasing wheel. The inclined faces cause the stylus force releasing wheel itself to rotate when one of the inclined faces is pushed by the selection pole, and same number of locking arms, each of which is positioned to confront the back face of each selection pole, pushes one of the inclined faces. Each selection pole also has a jaw which catches each confronting locking arm to prevent retraction of the selection pole.

There is also provided a locking means which locks the stylus force releasing wheel at the position to which the wheel has rotated against the force of a spring.

In addition, the record disc unit consists of a record face member and a turn table member spaced from each other but assembled in a stacked relationship in the axial direction. A stopper pin is provided on the record face member.

Moreover, since a ratchet means is interposed between the record face member and the turn table member, when the stopper pin is locked to the selection pole, only the turn table member can rotate. Thus, the turn table member is urged and moved along the center pin toward the bottom of the chassis by the ratchet by ratchet bight.

The locking means mentioned above comprises a hook for locking the stylus force releasing wheel at the position up to which it has rotated against the normally applied force and an inclined face for unlocking the stylus force releasing wheel. The removal of the turn table member will push either the inclined face or the hook thereby releasing the locking of the stylus force releasing wheel by the hook. This allows the stylus force releasing wheel to return to the direction of urging.

According to the present invention, even if the operator has taken his hand away from the selection pole immediately after his first depression for selecting sound reproduction, the stopper pin is caught by the selection pole and initiates the ratchet means, so the stylus force releasing wheel does not return to its original position, until the lock means at the position to which the wheel has rotated, is released.

As mentioned above, the device is kept in a condition free from the application of stylus force until the time when the time when the pickup has returned to the starting point of sound reproduction. Thus, the operation of selection can be performed without fail.

In addition, the continued pushing of the selection pole is no longer required. This enables a speed up of the selection operation.

DETAILED DESCRIPTION OF THE PREFERRED EMBODIMENTS

Figure 1:
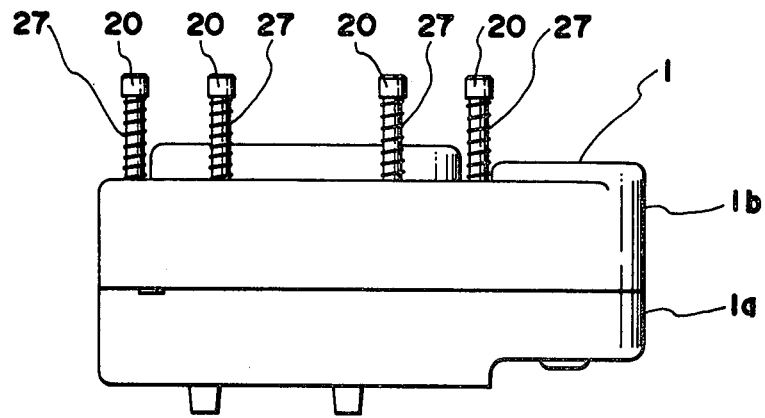
FIG. 1 is a front view showing a preferred embodiment of the sound-reproducing device of the present invention.
Figure 2:
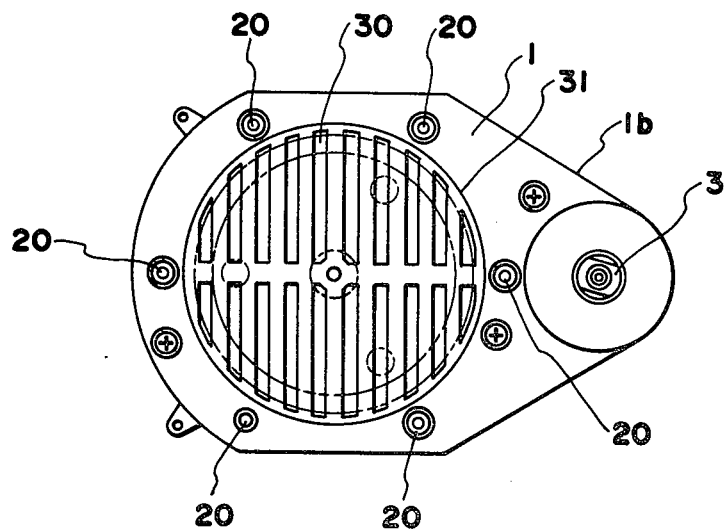
FIG. 2 is a plan view of the device shown in FIG. 1.

FIGS. 1 and 2 show the outside appearance of the simplified sound-reproducing device of the present invention.

A casing 1 includes a chassis 1a and a housing 1b stacked thereon with its open side placed down.

The casing 1 has, on the upper face of its housing 1b, a speaker box 31 having a plurality of slits 30 for emitting reproduced sounds.

There are six outwardly projecting selection poles 20 which are positioned around the speaker box 31. Each of the selection poles 20 is mounted in the casing 1 and is movable for insertion and retraction into and away from the casing 1 and is normally urged by a spring 27 outward toward the direction of retraction.

FIGS. 3 and 4(A) to (D) show the interior of the device. According to these figures, a middle deck or plate 1c is stacked on the chassis 1a and is covered by the housing 1b. As shown particularly by FIG. 3 and FIG. 4(B), a tone arm 29 having a pickup 13 at its forward end is pivotally attached at its rear end to the middle plate 1c. On the right side end of the upper face of the middle plate 1c, a motor 3 is fixedly attached with its output shaft being directed downward toward the bottom of the chassis 1a.

In addition, a sound transmitting member 8 having a configuration like a capital letter "Y", which constitutes a speaker unit 9 together with a speaker cone, is mounted at its bifurcated ends on the middle plate 1c such that the sound transmitting member 8 can swingably move toward and away from the upper face of the middle plate 1c.

The remaining part of the sound transmitting member extends radially outward so as to be supported by a pickup 13. The sound transmitting member 8 is also urged, at the portion indicated by the symbol Y in FIG. 3 where the bifurcated arms branch outward, by a stylus force spring 10 mounted to the middle plate 1c to constitute a cantilever so that it can urge the pickup 13 downward from an upper position.

Figure 3:
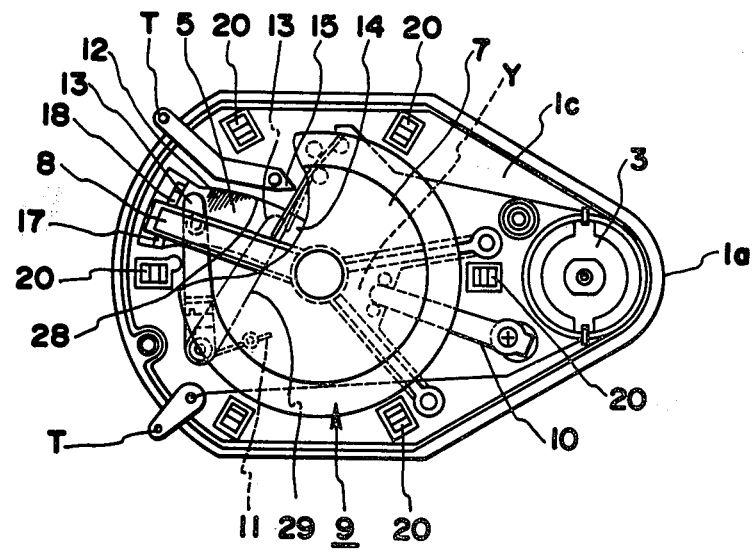
FIG. 3 is a plan view with the housing of the sound reproducing device having been removed.

In FIG. 3, reference numeral 15 depicts an ending switch disposed on the middle plate 1c and positioned in an electric circuit from a motor 3 so that it can cutoff the current to the motor 3 when the pickup 13 has finished sound reproduction and has reached the end point of travel. The ending switch 15 is also connected to a terminal T which projects outside of the casing 1. Reference numeral 28 denotes an aperture through which the pickup 13 extends below the middle plate 1c.

Figure 4:
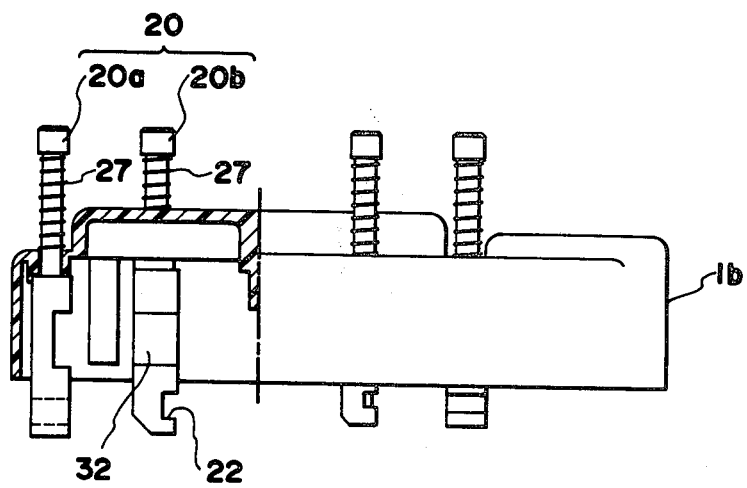
FIGS. 4(A) to 4(D) are partly sectioned, broken down drawings of the sound-reproducing device.
Figure 4:
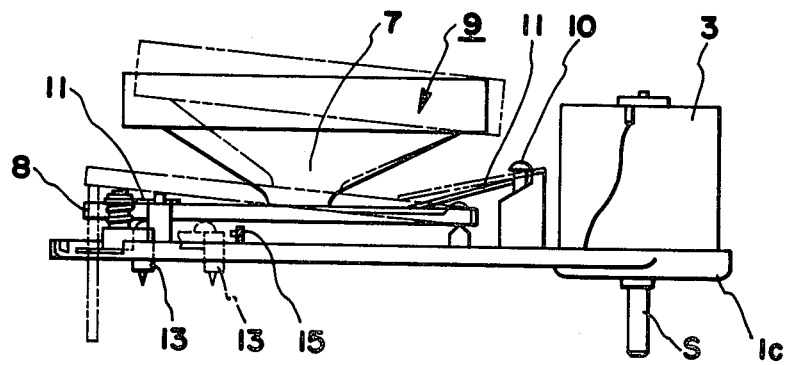
Figure 4:
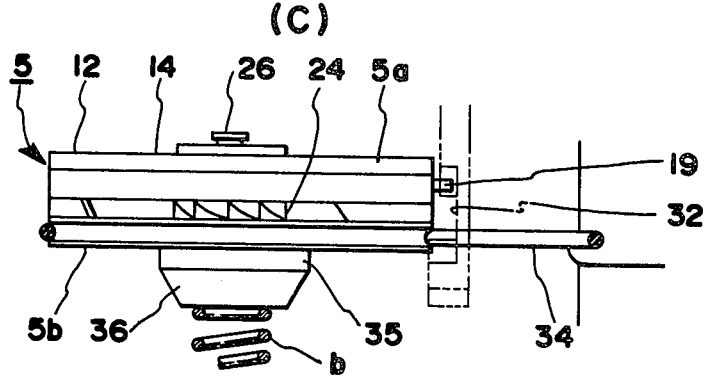
Figure 4:
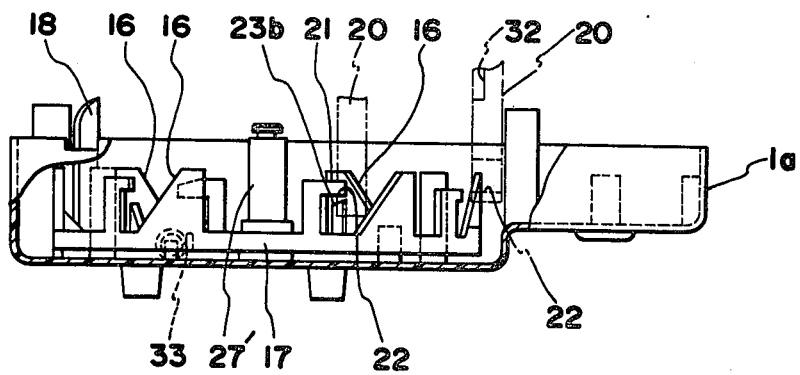
Figure 6:
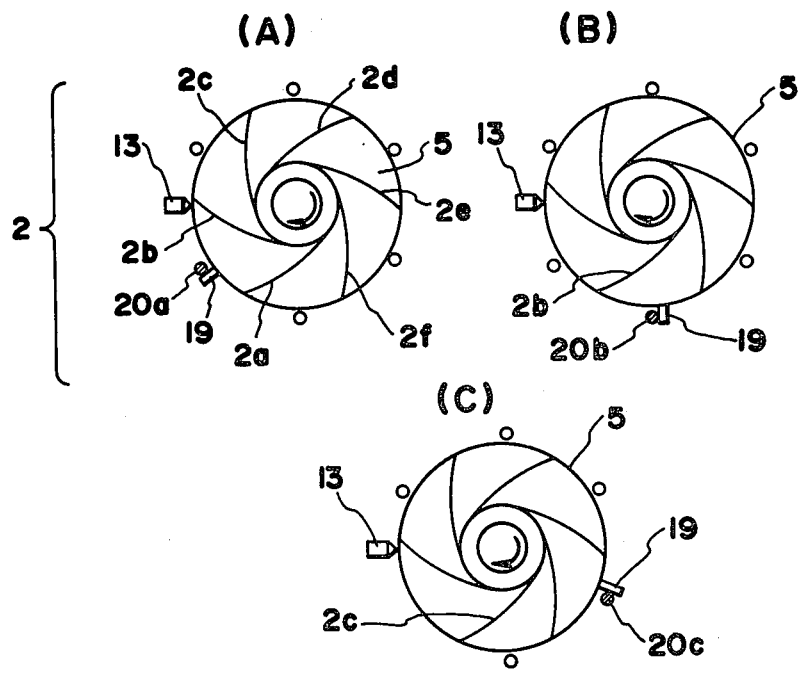
FIGS. 6(A), (B) and (C) are plan views of the record disc unit.

As shown in FIG. 3 and FIG. 4(C), reference numeral 5 depicts a record disc unit, the recorded face of which has, as particularly shown in FIG. 6, six recorded grooves 2. The recorded grooves 2 and the selection poles 20 are arranged in equal number. The pickup 13 is normally urged by a return spring 11 toward the starting point of sound reproduction 12 on the recorded face of the record disc 5 and away from the recorded face. The return spring 11 is attached to and wound around the rear end of the tone arm 29 which constitutes a pivot point. The ending switch 15 is disposed at the end point of sound reproduction 14 adjacent to the center of the recorded face of the record disc unit 5.

Figure 5:
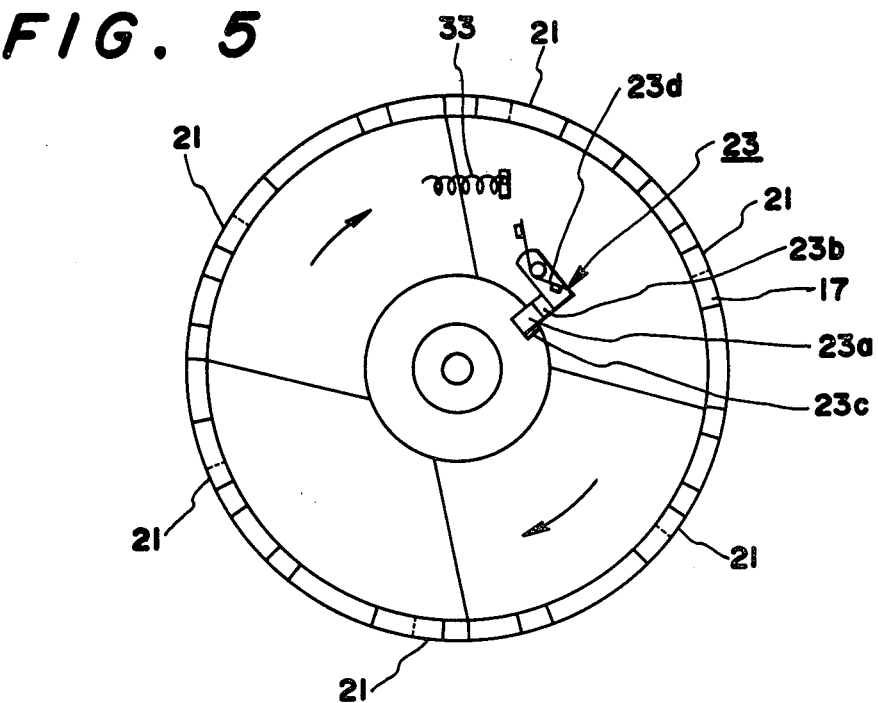
FIG. 5 is a plan view showing a stylus pressure releasing wheel and the locking means.

As particularly shown in FIG. 4(D), a center pin 27' is disposed upright at the central part and within the chassis 1a, around which the record disc unit 5 and a stylus force releasing wheel 17 are rotatably carried. The stylus force releasing wheel 17 carries thereon, as shown in FIGS. 4(C) and 4(D), six inclined face projections corresponding to the number of recorded grooves 2 and a stylus force releasing post 18 having at its upper end an inclined face for lifting up action. Particularly, the center pin 27' has at its top a washer 26 which axially suppresses the record disc unit 5 so that it cannot escape off of the center pin 27'. In addition, as shown in FIG. 4(D) and FIG. 5, the stylus force releasing wheel 17 is urged normally by a spring 33 to rotate in a predetermined direction.

The stylus force releasing wheel 17 and the record disc unit 5 are disposed below the middle plate 1c. Accordingly, when the housing 1b, the midde plate 1c, the record disc unit 5, the stylus force releasing wheel 17 and the chassis 1a as shown broken down in FIGS. 4(A) to 4(D) are assembled together, the pickup 13 can engage the recorded face of the record disc unit 5 through the aperture 28. Under this condition, biasing force from the stylus force spring 10 to the sound transmitting member 8 is imparted to the pickup 13.

The pickup 13 also can travel between the starting point 12 and the end point 14 of sound reproduction while being interposed between the sound transmitting member 8 and the record disc unit 5.

The lowermost tip end of the selection poles 20 are positioned to confront the tapered projection 16. The stylus force releasing lever 18 is positioned so that its inclined face at the tip end extends adjacent to the sound transmitting member 8 so as to be able to lift it.

The record disc unit 5 is assembled such that the record face member 5a is stacked on the turn table member 5b. A ratchet means 24 is provided around the shaft of these confronting two members.

When the ratchet means 24 is in a meshed position, the record face member 5a and the turntable member 5b are brought to a closed most stable position in an axial direction. A stopper pin 19 is disposed at the outer periphery of the record face member 5a and projects radially outward. The turn table member 5b is formed with a boss 35 at its lower portion around the center shaft 17 and the lower part of the boss is formed as an annular tapered face 36, on the lowermost bottom face of which a supporting spring 6 is placed under compression to normally urge the record disc unit 5 toward the washer 26.

When the broken down components shown in FIG. 4(A) through 4(D) are assembled together, the selection poles 20 pass closely outside of the periphery of the record disc unit 5 so that the lowermost tip ends of the selection poles 20 can face the inclined face 16 of the stylus force releasing wheel 17. Each of the selection poles 20 has at a portion on its side face confronting the outer periphery of the record disc unit 5 and at the height where the stopper pin rotates, a recess 32 which permits free rotation of the stopper pin 19 when a selection pole is not depressed.

When one of the selection poles is depressed against the force of its associated spring 27, the recess 32 is lowered below the rotational path of the stopper pin 19, so the side face which disturbs the rotation of the stopper pin 19 confronts the record disc unit 5 and, further, the tip end of the selection pole 20 pushes the inclined face 16 of the stylus force releasing wheel 17.

The outer periphery of the turn table member 5a of the record disc unit 5 is formed as a pulley groove, around which a resilient belt 34 extends for mechanical coupling to the output shaft S.

The inclined face 16 is formed on each of the six projections and the same number of locking arms 21 are also formed such that each arm faces a respective inclined face 16.

Each selection pole 20 also has a jaw 22 which receives the locking arm 21 when the selection pole 20 is pushed against the spring 27. In otherwords, the tip end of the selection pole 20 is interposed between the inclined face 16 and the locking arm 21 and, when the selection pole is pushed against the spring 27, the jaw 22 descends to a height confronting the locking arm 21 to catch the locking arm 21 which is being advancing due to the forced rotation of the stylus force releasing wheel 17 against the spring 33.

As shown in FIG. 5 a locking means 23 is disposed on the bottom of the chassis 1a and closely adjacent to the outer periphery of the central boss of the stylus force releasing wheel 17.

The locking means 23 consists of a L shaped hook 23a one end of which can rotate in a horizontal direction above the chassis 1a, a tapered piece 23b which upstands from the hook 23a to confront the tapered face 36 formed on the boss 35 of the turn table member 5b, and a spring 23d which normally urges the tip end of the hook 23a against the outerperiphery of the central boss of the stylus force releasing wheel 17. A locking recess 23c is formed on the outer surface of the central boss of the stylus force releasing wheel 17 at the location which confronts the tip end of the hook 23a.

FIG. 5 shows the state wherein the stylus force releasing wheel 17 rotates against the spring 33 and the hook 23a engages the recess 23c such that the stylus force releasing wheel 17 is held at the rotated position against the resilient force imparted by the spring 33.

The device of the present invention functions as follows.

The pickup 13 which has just finished reproduction of one of the recorded grooves 2 is positioned at the end point of sound reproduction 14 and has interrupted the current supply to the motor 3 by opening the ending switch 15. If one depresses the selection pole 20a out of a set of selection poles 20, as shown in FIG. 6(A), the tip end of the selection pole 20a will push one of the inclined faces 16 on the stylus force releasing wheel 17 to rotate to the right as viewed in FIG. 4(D).

By this rotation, the stylus force releasing post 18 moves in a direction to lift up the sound transmitting member 8. This results in releasing the stylus force imparted to the pickup 13. Accordingly, the pickup 13 can revert to the starting point 12 of sound reproduction by the force imparted by the return spring 11. Thus, the ending switch 15 is exempted from supporting by the pickup 13 and closes an electric contact which causes the motor 3 to rotate. Due to rotation of the motor 3, the record disc unit 5 rotates in the direction shown by arrow marks in FIG. 6(A), (B) and (C) until it is stopped by a stopping action caused by the impinging of the stopper pin 19 on one of the selection poles 20a shown in cross section in FIG. 6(A). The selection poles 20 are constructed in such a locational relationship with the introductory part of the recorded groove shown by 2a that the specified selection pole can engage the pickup 13 which reverts to the starting point of sound reproduction upon further rotation of the record disc unit 5.

In the case shown in FIG. 6(B), if one pushes the selection pole 20b, a locational relationship is set up such that the pickup 13 can only engage the recorded groove 2b out of the many recorded grooves 2.

Similarly, as shown in FIG. 6(C), the relationship between the selection pole 20c and the recorded groove 2c is specifically established in the same manner as mentioned above.

In this way, when one selection pole 20 is pushed by the operator, the stylus force releasing wheel 17 will start to rotate. Thus, results in release of the stylus force together with advancing of the locking arm 21 until it is locked by the jaw 22 of the pushed selection pole. Thus, only the pushed selection pole is locked by the locking arm 21 and is prevented from retraction.

The rotation of the stylus force releasing wheel 17 which has been effected against the urging force can be prevented from subsequent reverse rotation caused by the spring 33 by virtue of the hooking action between the hook 23a of the locking means 23 and the recess 23c formed on the axial boss of the stylus force releasing wheel 17.

This means that, if the operator has taken his hand away from one of the selection poles 20 immediately after its depression, the selection pole 20 can lock the stopper pin 19, so that the record face member 5a of the record disc unit 5 is temporarily locked thereby allowing only the turn table member 5b to rotate. This, in turn, lets the ratchet means 24 move out of meshing so as to allow the turn table 5b to be lowered against the supporting spring 6 by the height of the teeth of the ratchet means 24 toward the bottom face of the chassis 1a.

By virtue of this movement, the tapered face 36 formed on the lower outer peripheral face of the boss 35 will push on the tapered face 23b of the locking means 23 and move the hook 23a out of meshing with the recess 23c against the urging of the spring 23d. Then the stylus force releasing wheel 17 will rotate and return to its original position under the urging of the spring 33.

Rotation of the stylus force releasing wheel 17 not only causes the locking arm 21 to retract and escape from the jaw 22 of the selection pole, but also causes the stylus pressure releasing post 18 to retract from its position holding the sound transmitting member 8.

Thus, a necessary stylus force or pressure is applied against the pickup 13 and, at the same time, the ratchet means 24 is placed in a meshing position by the resilient force of the supporting spring 6 accompanying rotation of the turn table member 5b and the record face member together as an integral body.

In this way, the pickup 13 can engage the specific introductory part of the record groove selected by the specific selection pole and will start reproduction of the desired recorded groove, while, upon arrival of the pickup 13 at the end point of sound reproduction 14, the pickup 13 urges the ending switch 15 to cutoff the current supply and stops rotation of the record disc unit 5.

According to the preferred embodiment mentioned above, the secured selection of the desired recorded groove on the record disc can be performed even if the operator has taken his hand away from the selection pole 20 immediately after its initial depression.

Figure 7:
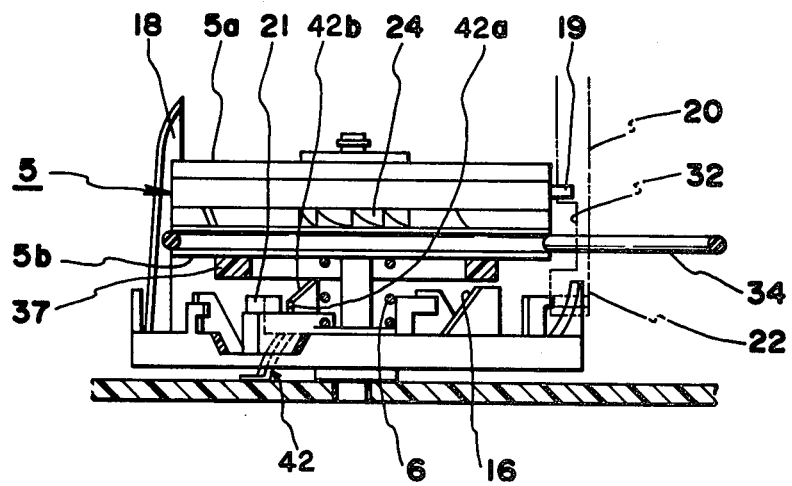
FIG. 7 is a partly sectioned front view showing the major parts of another embodiment of the present invention.
Figure 8:
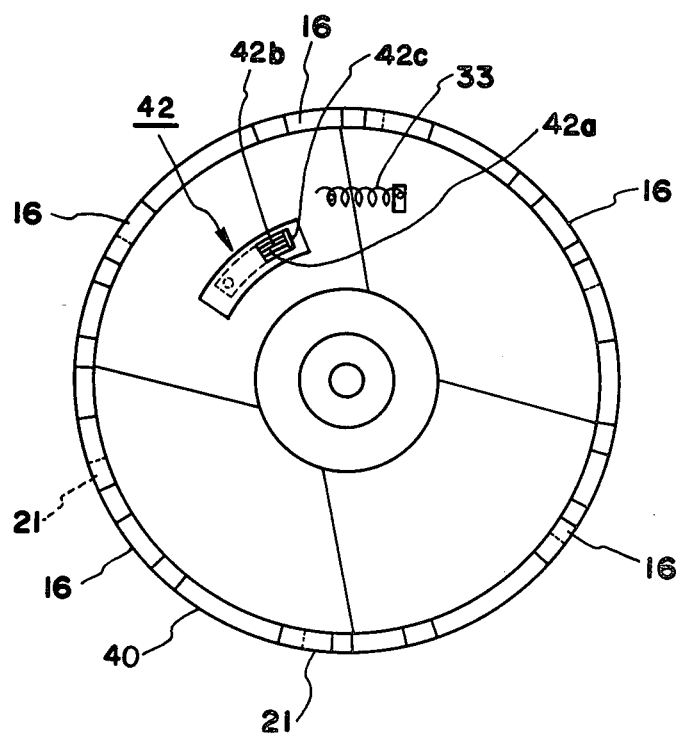
FIG. 8 is a plan view showing the stylus pressure releasing wheel and the locking means.

FIGS. 7 and 8 show another embodiment of the present invention, wherein only some parts of the locking means 23 and other relating parts differ from those of the embodiment described above, but the construction of the remaining portion of the device is entirely the same.

In order to avoid a repetitive description, explanation will now be made only for these different parts.

The rim of the annular stylus force releasing wheel 40 is raised upward to form a shallow box into which a upwardly bent leaf of a cantilevered leaf spring 42 extends, the opposite end of which is fixed on the base of the chassis 1a. The forward tip end of the leaf spring 42 is formed to constitute an upstanding hook portion 42a and a tapered face 42b contiguous to the hook portion 23a.

On the top face of the thus formed box like stylus force releasing wheel 40, a window-like aperture 42c is cut away, through which the integrally formed hook 42a and the inclined face 42b can further project upward.

The hook portion 42a and the inclined face 42b are housed within the interior of the box-like portion when the stylus force releasing wheel 17 is situated at its original position by the spring 33. The hook 42a projects through the window-like aperture 42c and abuts the rim of the aperture 42c when the stylus pressure releasing wheel 17 is rotated by the selection pole 20 against the resilient force of the spring 33.

On the reverse face of the turn table member 5b of the record disc unit 5 and at a position corresponding to the hook 42a, an annular projection 37 is provided.

Then the turn table 5b is lowered against the supporting spring by the rising of the ratchet means 24, the annular projection 37 pushes the forward end of tapered face 23b and, also, pushes the hook 42a through the window-like aperture 42c to descend below into the box-like portion and causes the tapered face 42b to be caught by the aperture 42c.

Since the stylus force releasing wheel is normally urged by the spring 33 to return to its original position, the inside face of the aperture 42c rotates in a direction to return to its original position while it is sliding on and urging the tapered face 42b to enter into the box-like member.

During this period, selection of the record groove for reproduction is repeatedly conducted in a manner similar to that described above. Subsequent reproduction and the advantages are also quite similar.

What is claimed is:

1. A simplified sound-reproducing device comprising:

a casing;

a motor housed within the casing and connectable to a source of electric current;

a record disc unit pivotally received in the casing and rotated by the motor, the record disc unit having a record faced with a plurality of recorded grooves, each with a starting and an end point of sound reproduction;

means for resiliently supporting the record disc unit;

a speaker unit swingably mounted in the casing above the record face of the record disc for movement to and away from the record face, the speaker unit including a speaker cone and a sound transmitting member;

stylus force means for urging the sound transmitting member toward the record face of the record disc;

a pickup interposed between the sound transmitting member and the record disc unit and imparted a stylus force by the stylus force means;

return spring means for biasing the pickup towards the starting point of sound reproduction on the recorded grooves and away from the record face;

an ending switch for opening the circuit between the source of electric current in the motor upon arrival of the pickup at the end point of sound reproduction on a recorded groove and closing the circuit between the source of electric current and the motor upon return of the pickup to the starting point of sound reproduction on a recorded groove;

a stylus force releasing wheel pivotally received in the casing, the stylus force releasing wheel being co-axial with the record disc unit and normally rotatable in one direction;

a plurality of inclined faces formed on the stylus force releasing wheel, the number of inclined faces being the same as the number of recorded grooves on the record disc unit;

a stylus force releasing post means formed on the stylus force releasing wheel for lifting up the record disc unit and releasing the stylus force by rotation of the stylus force releasing wheel and allowing the pickup to return to the starting point of sound reproduction by the urging of the return spring means;

a stopper pin projecting outward beyond the rotational rim of the record disc unit;

a plurality of selection poles provided a number corresponding to the number of recorded grooves on the record disc unit, each of which is disposed in a position to confront the inclined face of the stylus force releasing wheel so as to be able to engage and urge the inclined face, when depressed and also to catch the stopper pin and temporarily stop rotation of the record disc unit thereby locate the specifically selected introductory part of the record disc to the position where the pickup, which has returned to its starting point of sound reproduction, for engagement with the introductory part of the recorded grooves; and a plurality of springs, each provided on a selection pole for normally urging the selection poles to a retracted position outward from the casing; and wherein:

the stylus force releasing wheel includes a plurality of locking arms, each confronting a respective inclined face at a position backward of each selection pole, when each selection pole is in a depressed position, for urging said inclined face;

a jaw formed on each selection pole for catching and locking the locking arm of each selection pole to prevent it from retraction of the casing;

locking means for locking the stylus force releasing wheel at the position where the wheel has rotated against the urging of the spring means, the locking means comprising a hook for locking the stylus force releasing wheel at the position to which the stylus force releasing wheel is rotated against the urging of the spring means and an inclined face which acts to release the stylus force releasing wheel from its locked position;

the record disc unit comprises a turn table member and a record face member provided with a stopper pin, the turn table member and a record face member being arranged in a stacked, separated arrangement;

ratchet means interposed between the turn table and the record face member for enabling the turn table member alone to rotate and to enable the turn table member to be pushed and removed by the ratchet by tooth bight of the ratchet in an axial direction of the record face member temporarily locked by the engagement of the stopper pin with one of the selection poles; and whereby the removing action of the turn table member pushes the hook and disengages the stylus force releasing wheel from the hook to allow the stylus force releasing wheel to return to the direction of urging of the spring means.

2. The simplified sound-reproducing device as set forth in claim 1 wherein the locking means for locking the stylus force releasing wheel against the urging of the spring means comprises:

a recess formed in the outer periphery of the axial part of the stylus force releasing wheel;

a boss provided around the central axis of the turn table member at the side opposite from the record disc member;

spring means for urging the hook to swing in a plane parallel to the rotational plane of the stylus force releasing wheel;

an outstanding post provided on the hook, the post engaging the boss when the stopper pin temporarily locks the record face member and allows the turn table member to rotate and engages the boss when the boss is moved axially; and wherein the inclined surface is provided on either one of the boss and the outstanding post to release the stylus force releasing wheel from the locked position.

3. The simplified sound-reproducing device as set forth in claim 1 wherein the means for locking the stylus force releasing wheel comprises:

the hook is fixedly disposed on the bottom of the casing with respect to the direction of rotation of the stylus force releasing wheel but is allowed for relative axial movement;

an aperture opened in the stylus force releasing wheel to the axial direction of the stylus force releasing wheel;

spring means for urging the hook through the aperture in the rotating face of the stylus force releasing wheel;

the hook comprising an outstanding face facing opposite to the direction of which the stylus force releasing wheel is urged by the spring means so that the stylus force releasing wheel can be locked opposite to the direction of rotation when the hook has entered the aperture in the stylus force releasing means; and a tapered face formed on the hook contiguous to the outstanding face, the tapered face being urged in contact by the turn table member to allow aperture in the stylus force releasing wheel to slide along the tapered face when a stopper pin temporarily locks the record face member and lets the turn table member alone to rotate and be pushed and moved by the ratchet by the tooth bight of the ratchet to unlock the hook from engagement with the aperture in the stylus force releasing means.

* * * * *